United States Patent [19]

Stibbs et al.

[11] 3,811,899
[45] May 21, 1974

[54] INHIBITING GRAIN-GROWTH IN CERAMIC MATERIALS

[75] Inventors: Donald Stibbs, Dorking; Raymond Thompson, Esher; Oswald William John Young, Surbiton, all of England

[73] Assignee: United States Borax & Chemical Corporation, Los Angeles, Calif.

[22] Filed: June 19, 1972

[21] Appl. No.: 264,172

[30] Foreign Application Priority Data
July 23, 1971 Great Britain.................... 34686/71

[52] U.S. Cl..................... 106/43, 106/39.5, 264/65, 264/125, 264/332
[51] Int. Cl.. C04b 35/56, C04b 35/58, C04b 35/60
[58] Field of Search............ 106/43, 55, 39.5, 73.4, 106/65, 58; 264/65, 56, 332, 123, 125

[56] References Cited
UNITED STATES PATENTS

| | | | |
|---|---|---|---|
| 3,343,915 | 9/1967 | Rossi et al. ...................... | 264/332 X |
| 3,141,786 | 7/1964 | Bugosh .................................. | 264/65 |
| 3,725,094 | 4/1973 | Levy et al. ......................... | 106/73.4 |
| 3,093,498 | 6/1963 | Whittemore et al.................. | 264/65 |
| 3,437,606 | 4/1969 | Mercuri ............................ | 106/55 X |
| 3,632,710 | 1/1972 | Jahn................................... | 264/332 |
| 3,574,141 | 4/1971 | Berchtold ............................ | 106/55 |
| 3,379,523 | 4/1968 | Das Chaklader .................. | 264/332 |

*Primary Examiner*—Helen M. McCarthy
*Attorney, Agent, or Firm*—James R. Thornton

[57] ABSTRACT

Grain growth in hot-pressed ceramic materials is inhibited by treating the ceramic powder with a metal alkoxide and decomposing the alkoxide to the corresponding oxide prior to hot-pressing.

4 Claims, No Drawings

INHIBITING GRAIN-GROWTH IN CERAMIC MATERIALS

This invention relates to a method for inhibiting grain-growth during the formation of compacts of ceramic materials.

A convenient method for the fabrication of ceramic composites is that of hot-pressing. This method results in the densification of the ceramic material, but this densification is usually accompanied by an increase in ceramic particle-size. Such an increase is generally regarded as having a deleterious effect on the final mechanical strength of the product. It is known to inhibit the growth of ceramic particles under such conditions by incorporating certain mechanically disposed metal oxides amongst the ceramic particles before hot-pressing is carried out.

Hitherto, such methods have involved the mechanical mixing of the solid powdered oxide with the ceramic material prior to hot-pressing. It has now been found that the oxide is more advantageously introduced into the ceramic mixture in the form of the alkoxide of the appropriate metal.

Accordingly, this invention provides a method for inhibiting grain-growth in ceramic powders by treating the powder with a solution or suspension of the appropriate metal alkoxide, decomposing the alkoxide to produce the corresponding oxide in situ, and hot-pressing the mixture to form a ceramic composite of improved mechanical strength. The improved strength apparently results from the smaller grain size.

The alkoxides used in the process of the invention can be defined by the formula M $(OR)_n$, wherein M represents a divalent or trivalent metal of the group consisting of aluminum and the alkaline earth metals, such as magnesium, calcium, strontium and barium, R represents a saturated alkyl group containing from one to about five carbon atoms, such as methyl, ethyl, propyl, butyl, and pentyl, and $n$ is a positive integer equal to the valency of the metal M.

According to the method of this invention, the alkoxide is mixed, in the form of a solution or suspension in an organic solvent, with a ceramic powder based on boron. Preferably, the amount of alkoxide is up to about 0.375 percent by weight of the ceramic powder. This ceramic powder may be selected from boron carbide ($B_4C$), other boron-carbon containing ceramics, or the borides of the refractory metals, such as the borides of titanium, zirconium, tantalum, etc. The mixture is heated while being stirred at a temperature sufficient to evaporate the solvent and decompose the alkoxide to the corresponding oxide. The resultant oxide deposits on the surface of the ceramic particles. The mixture is then ball-milled to a uniform particle size and compacted by hot-pressing following known procedures. Although it is preferred to decompose the alkoxide completely before hot-pressing, it is possible to hot-press a ceramic mixture containing some residual alkoxide.

The following examples illustrate the invention.

EXAMPLE 1

Boron carbide (40 g.) was ball-milled to an average particle-size of 1 micron or less. The powder was hot-pressed to 2.5 t.s.i. for 14 minutes to a temperature of 2,000° to 2,200°C. The resultant hot-pressed product was found to have an average particle-size of 20 to 25 microns.

EXAMPLE 2

Boron carbide (40 g.) was added to powdered magnesium oxide (0.4 g.) and the mixture ball-milled to an average particle-size of 1 micron or less. The mixture was hot-pressed as in Example 1. Some restriction of grain-growth was observed and the resultant product was found to have a particle-size of 10 to 15 microns.

EXAMPLE 3

Boron carbide (40 g.) was mixed with a 7.5 percent solution of magnesium methoxide ($Mg(OCH_3)_2$) in 2 ml. of methanol. The mixture was heated, with continuous stirring, to a temperature of 150°C., at which point magnesium oxide deposited on the boron carbide particles and the solvent evaporated. The mixture was ball-milled to an average particle size of 1 micron or less and formed into a composite by pressing at 2.5 t.s.i. for 14 minutes to a temperature of 2,000° to 2,200°C. The product was found to have an average particle size of 2.5 microns.

EXAMPLES 4 – 6

The following mixtures were ball-milled to an average particle size of 1 micron or less:

| Ex. No. | $B_4C$ (g.) | Alkoxide |
|---|---|---|
| 4 | 40 | $Mg(OMe)_2$ in MeOH:7.5% soln. (1.0 ml) |
| 5 | 40 | $Al(OPr^i)_3$ in EtOH:10% soln. (1.0 ml) |
| 6 | 40 | $Mg(OBu)_2$ in MeOH:7.5% soln. (1.0 ml) |

The mixtures were then subjected to the process of Example 3.

The average particle size of the products was 2.0 to 2.5 microns.

Thus, as illustrated by Examples 3 to 6, the addition of up to 0.25 percent of the alkaline earth metal oxides, added as alcoholic solutions of their alkoxides, results in a greater grain-growth inhibiting effect than the addition of magnesia powder shown in Example 2.

Various changes and modifications of the invention, can be made and, to the extent that such variations incorporate the spirit of this invention, they are intended to be included within the scope of the appended claims.

What is claimed is:

1. In the method of hot-pressing boron carbide powder, the improvement which comprises treating said powder with a metal alkoxide of the formula M $(OR)_n$ prior to fabrication, thereby inhibiting grain-growth during fabrication, wherein M represents a divalent or trivalent metal selected from the group consisting of magnesium, calcium, strontium, barium or aluminum, R represents a saturated alkyl radical containing about one to five carbon atoms, and $n$ is a positive integer equal to the valency of the metal M.

2. The method according to claim 1, in which the metal alkoxide is decomposed during fabrication to the corresponding oxide.

3. The method according to claim 1 in which the metal alkoxide is decomposed to the corresponding oxide prior to hot-pressing.

4. The method according to claim 1 in which the metal alkoxide is magnesium methoxide, magnesium butoxide, or aluminum isopropoxide.

* * * * *